United States Patent
Reichert et al.

(10) Patent No.: US 10,724,579 B2
(45) Date of Patent: Jul. 28, 2020

(54) AUTOMOTIVE DRIVELINE DISCONNECT ASSEMBLY

(71) Applicant: GKN Driveline North America, Inc., Auburn Hills, MI (US)

(72) Inventors: Paul F. Reichert, Rochester Hills, MI (US); Robert Nelson, Bloomfield Township, MI (US); Samuel J. Oram, Tochigi (JP)

(73) Assignee: GKN Driveline North America, Inc., Auburn Hills, MI (US)

( * ) Notice: Subject to any disclaimer, the term of this patent is extended or adjusted under 35 U.S.C. 154(b) by 221 days.

(21) Appl. No.: 15/748,204

(22) PCT Filed: Aug. 10, 2016

(86) PCT No.: PCT/US2016/046355
§ 371 (c)(1),
(2) Date: Jan. 29, 2018

(87) PCT Pub. No.: WO2017/027594
PCT Pub. Date: Feb. 16, 2017

(65) Prior Publication Data
US 2018/0216671 A1     Aug. 2, 2018

Related U.S. Application Data

(60) Provisional application No. 62/203,082, filed on Aug. 10, 2015.

(51) Int. Cl.
*F16D 11/14* (2006.01)
*B23F 15/06* (2006.01)
(Continued)

(52) U.S. Cl.
CPC .............. *F16D 11/14* (2013.01); *B23F 15/06* (2013.01); *F16D 23/12* (2013.01);
(Continued)

(58) Field of Classification Search
None
See application file for complete search history.

(56) References Cited

U.S. PATENT DOCUMENTS

| 2,025,825 A | 12/1935 | Ricefield |
| 2,384,583 A | 9/1945 | Wildhaber |

(Continued)

FOREIGN PATENT DOCUMENTS

| CN | 102007313 A | 4/2011 |
| DE | 102012216988 A1 | 4/2014 |

(Continued)

OTHER PUBLICATIONS

CN Office Action for CN Application No. 201690001085.8 dated Oct. 26, 2018 (1 page).

(Continued)

*Primary Examiner* — Colby M Hansen
(74) *Attorney, Agent, or Firm* — Jennifer M. Brumbaugh; Reising Ethington P.C.

(57) ABSTRACT

An automotive driveline disconnect assembly includes a first clutch part and a second clutch part, and is designed and constructed to preclude an occupant-audible noise from being made between components of the disconnect assembly. The preclusion of the occupant-audible noise can be effected via one or more dampers, a non-flat tooth profile, or a combination of these measures. The disconnect assembly can be equipped in a larger automotive driveline component such as a power transfer unit (PTU), a final drive unit (FDU), a rear drive module (RDM), or an electronic differential locker (EDL).

20 Claims, 5 Drawing Sheets

(51) Int. Cl.
*F16D 23/12* (2006.01)
*F16F 15/12* (2006.01)
*F16D 11/00* (2006.01)

(52) U.S. Cl.
CPC .... *F16F 15/1201* (2013.01); *F16D 2011/008* (2013.01); *F16D 2023/123* (2013.01)

(56) References Cited

U.S. PATENT DOCUMENTS

| | | | |
|---|---|---|---|
| 2,405,171 A * | 8/1946 | Wildhaber | F16D 11/14 |
| | | | 192/69.8 |
| 3,043,414 A * | 7/1962 | Peras | F16D 11/10 |
| | | | 192/114 T |
| 3,831,724 A | 8/1974 | Baer | |
| 4,307,795 A | 12/1981 | Roy | |
| 4,727,968 A | 3/1988 | Chana | |
| 6,112,873 A | 9/2000 | Prasse et al. | |
| 7,445,575 B2 | 11/2008 | Capito | |
| 8,851,260 B2 | 10/2014 | Reisch et al. | |
| 2005/0217961 A1 | 10/2005 | Harrison et al. | |
| 2010/0044138 A1 | 2/2010 | Marsh et al. | |
| 2013/0199884 A1 | 8/2013 | Eder et al. | |
| 2013/0240317 A1* | 9/2013 | Mori | F16D 11/14 |
| | | | 192/69.8 |
| 2016/0040726 A1* | 2/2016 | Shiotsu | F16D 11/14 |
| | | | 74/333 |

FOREIGN PATENT DOCUMENTS

| | | |
|---|---|---|
| JP | S57169828 U | 10/1982 |
| JP | 2002098164 A | 4/2002 |
| JP | 2009127852 A | 6/2009 |

OTHER PUBLICATIONS

Written Opinion & International Search Report for PCT/US2016/046355 dated Oct. 25, 2016, 13 pages.

JP Office Action for JP Application No. 2018-506947 dated May 12, 2020 (15 page).

* cited by examiner

US 10,724,579 B2

AUTOMOTIVE DRIVELINE DISCONNECT ASSEMBLY

REFERENCE TO RELATED APPLICATIONS

This application claims the benefit of U.S. Provisional Application Ser. No. 62/203,082 filed on Aug. 10, 2015, the entire contents of which are incorporated herein by reference.

TECHNICAL FIELD

The present disclosure relates generally to automotive driveline disconnect assemblies, and relates more particularly to minimizing occupant-audible noises made between connecting parts of automotive driveline disconnect assemblies.

BACKGROUND

In general, automotive drivelines transmit torque from an engine and eventually to a set of wheels. Automotive drivelines, such as all-wheel drive (AWD) drivelines, sometimes include power transfer units (PTUs), final drive units (FDUs), rear drive modules (RDMs), electronic differential lockers (EDLs), disconnecting differentials and other types of differentials, or a combination of these components to transmit the torque. The exact components in a particular automotive driveline often depends on the architecture of the overall driveline and on the arrangement of the accompanying engine and transmission.

Furthermore, the PTUs, FDUs, RDMs, EDLs, and differentials can be equipped with disconnect and re-connect capabilities in which disconnected components are no longer driven to transmit torque between them. The capabilities preclude driven torque in regions of the automotive drivelines not needing torque at a particular time. For instance, on-demand AWD drivelines do not always transmit torque among all of its shafts at all times. Disconnect and re-connect capabilities have been shown to enhance fuel efficiency, reduce emissions, and provide yet additional performance improvements.

SUMMARY

In one implementation, an automotive driveline component may include a disconnect assembly having a first clutch part and a second clutch part. The first clutch part has a first set of teeth, and the second clutch part has a second set of teeth. The disconnect assembly includes a damper that is situated between the first clutch part and the second clutch part. When the disconnect assembly is brought to a connected state, the first clutch part or the second clutch part come into contact with the damper before full engagement is made between the first and second clutch parts.

In another implementation, an automotive driveline component may include a disconnect assembly and a cam assembly. The disconnect assembly may have a first clutch part, a second clutch part, and a damper. The damper may be partly or more situated around an exterior surface of the first clutch part or the second clutch part. The cam assembly may be located at an exterior of the disconnect assembly. The cam assembly may interact with the disconnect assembly in order to bring the disconnect assembly to a connected state and a disconnected state. The damper may be disposed radially between the cam assembly and the first clutch part or the second clutch part. When the disconnect assembly is brought to the connected state and to the disconnected state, direct abutment between the first clutch part or the second clutch part and the cam assembly is at least partly minimized—if not altogether precluded—by way of the damper and its location.

In yet another implementation, an automotive driveline component may include a disconnect assembly and a cam assembly. The disconnect assembly may include a first clutch part, a second clutch part, a first damper, and a second damper. The first clutch part has a first set of teeth, and the second clutch part has a second set of teeth. The first damper may be situated between the first clutch part and the second clutch part. The second damper may be situated partly or more around an exterior surface of the first clutch part or the second clutch part. The cam assembly may be located at an exterior of the disconnect assembly. The cam assembly may interact with the disconnect assembly in order to bring the disconnect assembly to a connected state and a disconnected state. The second damper may be disposed radially between the cam assembly and the first clutch part or the second clutch part.

BRIEF DESCRIPTION OF THE DRAWINGS

The following detailed description of preferred implementations and best mode will be set forth with regard to the accompanying drawings, in which.

DETAILED DESCRIPTION

Referring in more detail to the drawings, different embodiments of an automotive driveline disconnect assembly 10 (hereafter, disconnect assembly) are designed and constructed to preclude an occupant-audible noise from being made between components of the disconnect assembly 10. One or more dampers, a non-flat tooth profile, or both of these measures, can be employed in the disconnect assembly 10 in order to effect the precluded passenger-audible noise. The measures can be furnished without threatening the torque transfer effectiveness of the disconnect assembly 10. The disconnect assembly 10 can be equipped in a larger automotive driveline component such as a power transfer unit (PTU), a final drive unit (FDU), a rear drive module (RDM), an electronic differential locker (EDL), a disconnecting differential, or another type of differential. In this regard, the phrase "automotive driveline component" is used herein in a broad sense to embrace PTUs, FDUs, RDMs, EDLs, and differentials, as well as similar driveline components.

Furthermore, the terms axial, radial, circumferential, and their grammatical variations are used herein with reference to the generally circular and cylindrical shape of the disconnect assembly 10 and its components, such that axial refers to a direction generally along or parallel to an axis of the circular and cylindrical shape, radial refers to a direction generally along or parallel to a radius of the circular and cylindrical shape, and circumferential refers to a direction generally along or parallel to a circumference of the circular and cylindrical shape.

Figure 10:
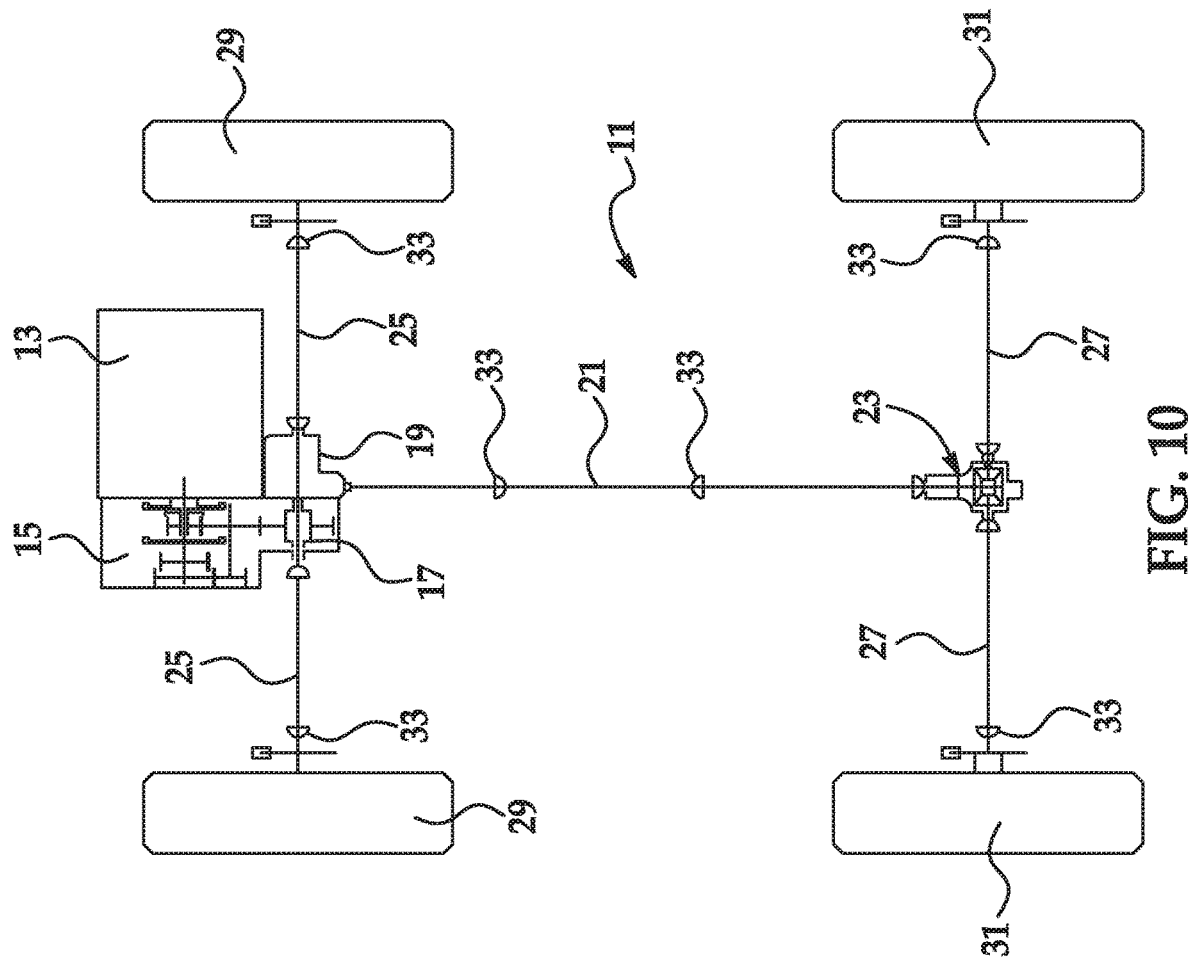
FIG. 10 is a schematic depiction of an example of an all-wheel drive (AWD) automotive driveline.

In general, the disconnect assembly 10 can be part of a larger disconnect system in the accompanying automotive driveline that could include additional disconnect capabilities at other sites and in other driveline components. One example architecture of an all-wheel drive (AWD) automotive driveline 11, for instance, is depicted in FIG. 10. The driveline 11 receives torque input from an engine 13 and a transmission 15, and includes a front differential 17, a power transfer unit (PTU) 19, a propshaft 21, a final drive unit 23, front sideshafts 25, and rear sideshafts 27. The front and rear sideshafts 25, 27 respectively spin front and rear wheels 29, 31. In the example presented here, various joints 33 are equipped at the propshaft 21 and at the sideshafts 25, 27. The joints 33 could be constant velocity joints, universal joints, tripod joints, cardan joints, or another kind of joint. Together, the driveline components transmit torque from the engine 13 and to the wheels 29, 31. Still, the driveline 11 could have other architectures in other examples and might include more, less, and/or different components than those depicted in FIG. 10 and described here, and the components could be arranged in different ways. Indeed, the exact architecture and its components are often dictated by the particular vehicle platform and set by the manufacturer. Yet additional example architectures include a longitudinally-arranged engine mounted at a frontward or rearward location, or a transversely-arranged engine mounted at a frontward or rearward location.

Figure 2:
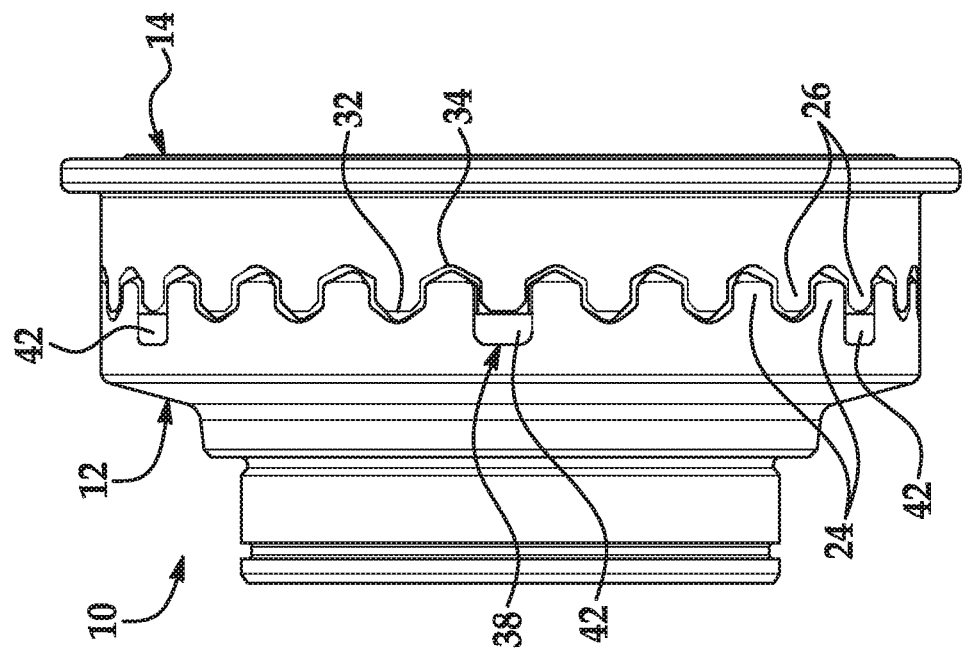
FIG. 2 is a side view of the automotive driveline disconnect assembly of FIG. 1.
Figure 1:
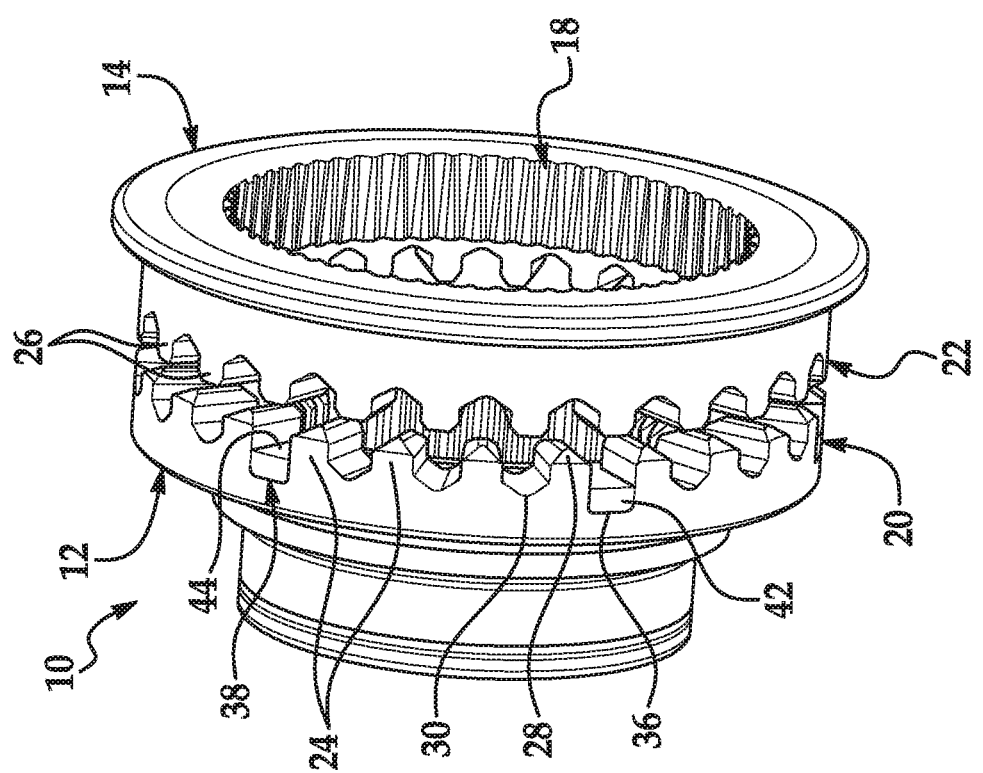
FIG. 1 is a perspective view of an embodiment of an automotive driveline disconnect assembly having a damper.
Figure 3:
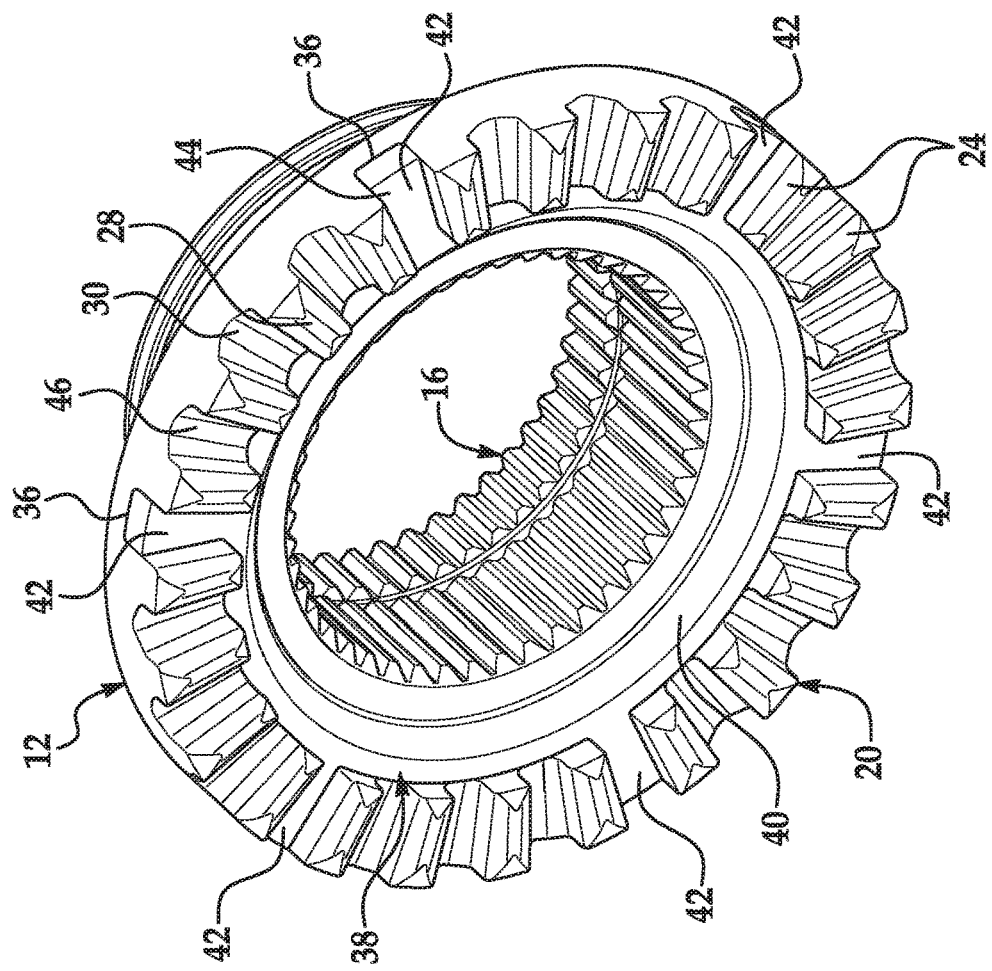
FIG. 3 is a perspective view of a first clutch part and the damper of the automotive driveline disconnect assembly of FIG. 1.

The disconnect assembly 10 can have different designs and constructions depending upon, among other possible influences, the automotive driveline component in which it will be equipped, packaging requirements, and torque output demands. With reference to FIGS. 1-3, in this embodiment the disconnect assembly 10 is of the dog clutch type. The disconnect assembly 10 includes a first clutch part 12 and a second clutch part 14. Both parts are conventionally composed of metal materials. The first clutch part 12 can remain fixed in the axial direction amid disconnect and re-connect movements of the disconnect assembly 10, and, in the example of the dog clutch, is referred to as a fixed dog. The second clutch part 14, on the other hand, can move toward and away from the first clutch part 12 in the axial direction amid disconnect and re-connect movements of the disconnect assembly 10. In the example of the dog clutch, the second clutch part 14 is referred to as a sliding dog. Both the first and second clutch parts 12, 14 in the figures have internal sets of splines 16, 18 for interconnecting to components of the larger automotive driveline component and transferring torque therebetween.

Furthermore, each of the first and second clutch parts 12, 14 have sets of teeth arranged on opposing and confronting faces of the first and second clutch parts 12, 14. A first set of teeth 20 spans around a circumference of the first clutch part 12, and a second set of teeth 22 spans around a circumference of the second clutch part 14. The first and second sets of teeth 20, 22 mate and mesh together in order to transfer torque between the first and second clutch parts 12, 14. The mated and meshed teeth are depicted in FIG. 2.

The first set of teeth 20 is made up of multiple individual tooths 24, and, likewise, the second set of teeth 22 is made up of multiple individual tooths 26. The first set of teeth 20 is formed by undulating peaks and valleys and tip faces 28 and roots 30, and the second set of teeth 22 is formed by undulating peaks and valleys and tip faces 32 and roots 34. In this embodiment, some of the roots 30 of the first set of teeth 20 have a greater axial depth than other roots 30 (axial depth, as intended here, is measured into the clutch part's body). As shown in FIG. 3, there are a total of six roots with greater axial depth—the greater depths, where discernible, are denoted with numeral 36. Of course, other quantities are possible in other embodiments. The increased axial depths create volumes for receiving portions of a damper 38, as described in more detail below.

It has been found that dog clutches in some cases can make a click-like or clank-like noise amidst connecting together that could be heard by an occupant of the accompanying automobile. The noise can be especially audible when dog clutches are located underneath front-seat occupants, when there is minimal road noise, and with dog clutches in hybrid powertrains. The noise is unwanted, particularly by luxury original equipment manufacturers. Moreover, the click-like noise—it has been found in one instance—can be a consequence of what-is-referred-to-as a tooth butt condition. The tooth butt condition is established when tip faces of confronting dog clutch teeth make face-to-face abutment and maintain that abutment for a period of time, instead of the intended tip face-to-root mating and meshing. The face-to-face abutment obstructs a face-to-root mating. Dog clutches could experience the tooth butt condition at lower automobile speeds such as when the automobile is decelerating to a stop. The dog clutches can concurrently decelerate their movement to a stop and, if in the midst of connecting, could encounter the tooth butt condition. And when the automobile begins moving again, the attendant movement of the dog clutches releases the tooth butt condition and its face-to-face abutment. The teeth are then relocated to their intended tip face-to-root mating and meshing. This sudden release and relocation and metal-to-metal clashing has been found to be a common culprit of the click-like noise.

In order to resolve these drawbacks, the damper 38 is situated between the first and second clutch parts 12, 14 to damp the metal-to-metal clashing and click-like noise that might otherwise occur at the time of full engagement between the first and second sets of teeth 20, 22 (an example of full engagement is depicted in the side view of FIG. 2). The damper 38 can have different designs and constructions depending upon, among other possible influences, the designs and constructions of the first and second clutch parts, and the degree of damping sought. In the embodiment of FIGS. 1-3, the damper 38 can be made of a softer material than that of the clutch parts 12, 14; examples include a rubber material, a polymer material, or something similar; urethane is another example for an embodiment. The damper 38 can be manufactured independently of the clutch parts 12, 14 as a separate component, can be overmolded in-place on the clutch part, or can be manufactured via another technique. The damper 38 can be a one-piece structure, and can have an annular body 40 and multiple tab-like extensions 42 spanning out radially from the body 40. In this embodiment there are a total of six extensions 42 to correspond to the six roots 36 of greater depth. The extensions 42 are sized and shaped complementary to the roots 36. Other quantities of extensions and corresponding roots of greater depth are of course possible in other embodiments.

The damper 38 is secured to, and carried by, the first clutch part 12 in the figures, but could be secured to and carried by the second clutch part 14 in other embodiments. The securement can be effected via a press-fit if the damper 38 is manufactured as a separate component, can be effected due to overmolding if manufactured that way, or can be effected another way. In the separate component example, and as perhaps illustrated best in FIG. 3, each extension 42 is placed within a companion root 36 and the body 40 is placed around an inside circumference defined by the first set of teeth 20. By this location, the damper 38 resides at a site that does not interfere with the disconnect and re-connect movements and inter-engagements of the disconnect assembly 10. In a sense, the damper 38 resides within an interior of the first clutch part 12, as depicted in FIG. 3, and is mostly or entirely isolated from engagement by components that would otherwise cause wear and tear to the damper 38.

Once set in place, the extensions 42 occupy the increased volumes created by the greater depths of the roots 36. When not compressed by the second clutch part 14, an outwardly-directed surface 44 of each extension 42 resides at a slightly higher level than outwardly-directed surfaces 46 of the roots 30 that lack the greater axial depth. In other words, the axial depth as measured to the surfaces 44 is less than the axial depth of the roots 30 as measured to the surfaces 46. In this way, and as described more below, the second set of teeth 22 come into contact with the damper's extensions 42 before the teeth 22 come into contact with the roots 30 and before the first set of teeth 20 come into contact with the roots 34—in other words, before full engagement is made between the first and second sets of teeth 20, 22 and torque is transmitted between the first and second clutch parts 12, 14.

Figure 4:
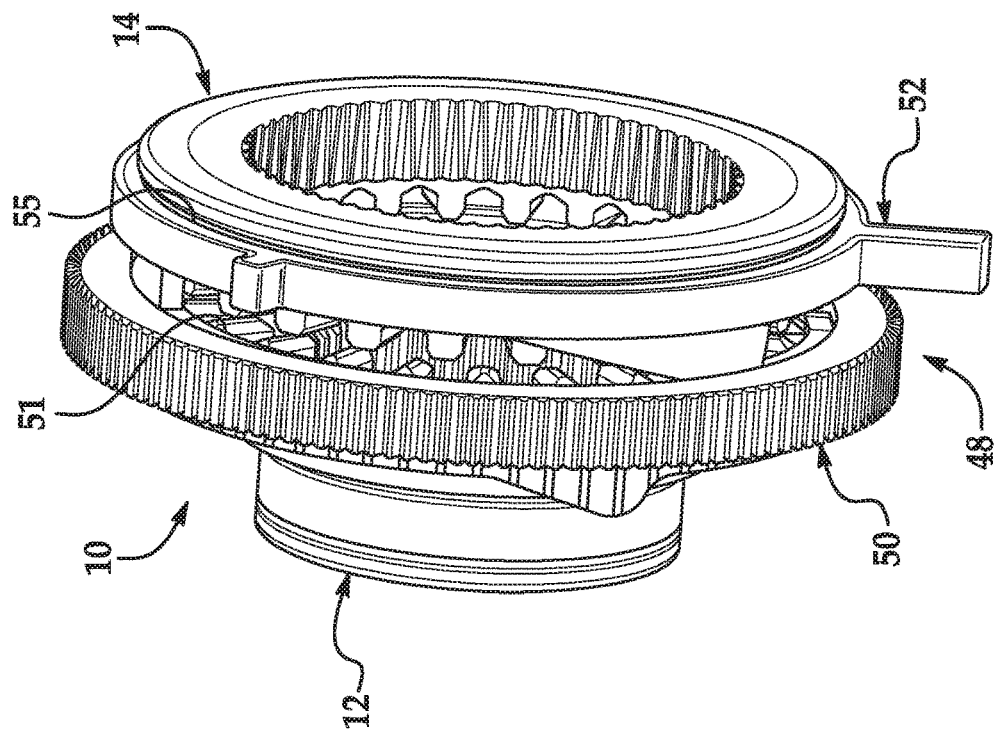
FIG. 4 is a perspective view of the automotive driveline disconnect assembly of FIG. 1 equipped with a cam assembly.

In installation and use, the disconnect assembly 10 is moved between a connected state (depicted in FIG. 2) and a disconnected state (depicted in FIG. 1). Movement between the states can be carried out by different actuation approaches. These include electric actuation, hydraulic actuation, electromagnetic actuation, and pneumatic actuation; still, other actuation types and techniques are possible. And depending on the approach, the actuation can include different components such as a shift fork, a ball cam mechanism, a piston, or other items and mechanisms. The example actuation technique of FIG. 4 presents a cam assembly 48 that includes a rotary cam 50 and a cam follower 52. The rotary cam 50 and cam follower 52 have a complementary and interacting lobe and recess construction that work together to translate rotational movement of the rotary cam 50 into linear reciprocation of the cam follower 52.

The damper 38 precludes the sudden metal-to-metal abutment and click-like noise that might otherwise occur. As the second set of teeth 22 of the second clutch part 14 are being received in respective roots 30, those tip faces 32 confronting the damper's extensions 42 come into contact with the outwardly-directed surfaces 44 before non-confronting tip faces 32 make metal-to-metal abutment with the outwardly-directed surfaces 46. At the same time, the tip faces 32 confronting the damper's extensions 42 come into contact with the surfaces 44 before tip faces 28 make metal-to-metal abutment with outwardly-directed surfaces of roots 34. The extensions 42 yield to the sliding movement and urging of the second clutch part 14 and are compressed thereby. The first and second set of teeth 20, 22 make face-to-root mating and complete meshing upon compression of the extensions 42. The extensions 42 serve to absorb forces that would otherwise be imparted more immediately and directly between metal-to-metal abutment of the first and second set of teeth 20, 22. The click-like noise is hence minimized or altogether eliminated. As described, these actions can also take place when the disconnect assembly 10 is operating as intended and does not experience the tooth butt condition.

Figure 6:
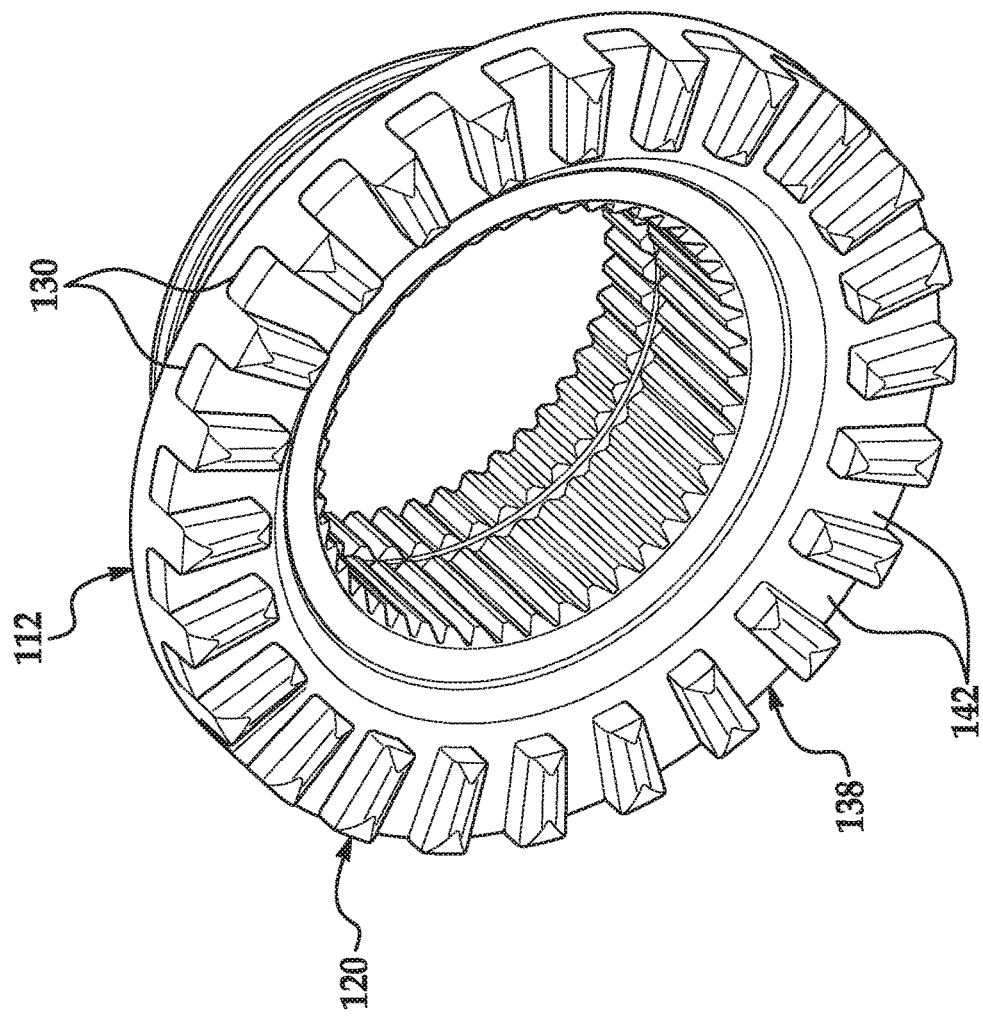
FIG. 6 is a perspective view of a first clutch part and the damper of the automotive driveline disconnect assembly of FIG. 5.
Figure 5:
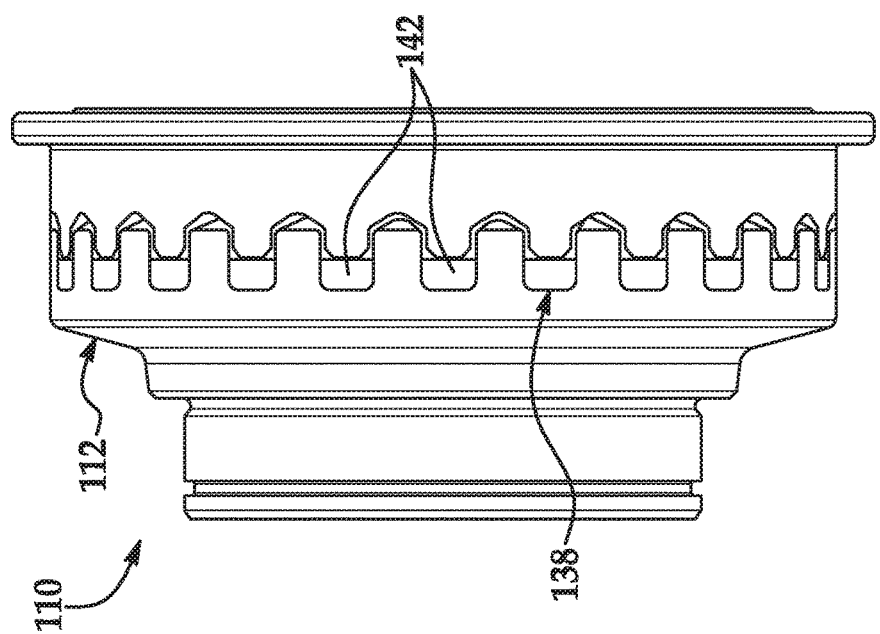
FIG. 5 is a side view of another embodiment of an automotive driveline disconnect assembly having a damper.

FIGS. 5 and 6 present another embodiment of a damper 138 that can be used with a disconnect assembly 110. This embodiment is similar in some ways to the damper embodiment of FIGS. 1-4, and the similarities may not be repeated in this description of FIGS. 5-6. Indeed, similar components in the embodiments of FIGS. 1-4 and FIGS. 5-6 have similar reference numerals, with the reference numerals of FIGS. 5-6 having the number 100 added to the reference numeral of the similar component in FIGS. 1-4.

In the embodiment of FIGS. 5 and 6, the damper 138 has one tab-like extension 142 for every root 130 of a first set of teeth 120 of a first clutch part 112. The roots 130 need not have depths of different extents like they do in the embodiment of FIGS. 1-4. Instead, all of the roots 130 can have the greater axial depths, as previously described, in order to accommodate the reception of the extensions 142. Compared to the embodiment of FIGS. 1-4, the extensions 142 may absorb more forces than those absorbed by the extensions 42 and may minimize any click-like noises to a greater degree.

Figure 7:
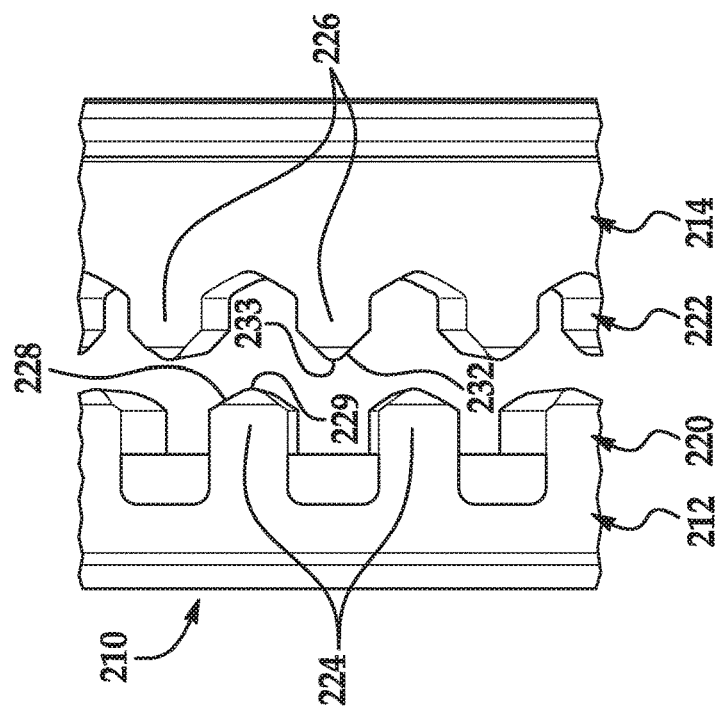
FIG. 7 is an enlarged view of an embodiment of a first set of teeth and a second set of teeth.

FIG. 7 presents another embodiment of a disconnect assembly 210. This embodiment is similar in some ways to the disconnect assembly embodiment of FIGS. 1-4, and the similarities may not be repeated in this description of FIG. 7. Indeed, similar components in the embodiments of FIGS. 1-4 and FIG. 7 have similar reference numerals, with the reference numerals of FIG. 7 having the number 200 added to the reference numeral of the similar component in FIGS. 1-4.

In the embodiment of FIG. 7, a first set of teeth 220 of a first clutch part 212 and a second set of teeth 222 of a second clutch part 214 are designed and constructed to impede or altogether prevent the occurrence of the tooth butt condition. Individual tooths 224, 226 of the first and second sets of teeth 220, 222 have a non-flat tooth profile, and instead are designed with a more pointed and rounded sectional profile as depicted in the enlarged side view of FIG. 7. Each of the tooths 224, 226 can have at least one surface with a non-parallel orientation relative to a radial plane of the circular and cylindrical shapes of the first and second clutch parts 212, 214. In one specific example, tip faces 228 of the first set of teeth 220 can have a pair of generally planar surfaces converging toward each other to a terminal peak 229. The planar surfaces can be set at an approximately fifty-five degree angle (55°) relative to the radial plane. Further, the terminal peak 229 can be slightly rounded off. And tip faces 232 of the second set of teeth 222 can have a pair of generally planar surfaces converging toward each other to a terminal peak 233. The planar surfaces can be set at an approximately forty-five degree angle (45°) relative to the radial plane. Further, the terminal peak 233 can be slightly rounded off. Of course, other examples with other surfaces at other angles are possible in other embodiments. Still, not all of the teeth 220, nor all of the teeth 222, need have the non-flat tooth profile; for instance, only some of the teeth 220 could have the non-flat tooth profile, only some of the teeth 222 could have the non-flat tooth profile, or a combination thereof.

The design of the tip faces 228, 232 impedes or altogether prevents the occurrence of the tooth butt condition by lacking flat and parallel face-to-face confronting surfaces that can more easily come to rest against each other. Instead, the non-parallel and angled surfaces of the tip faces 228, 232 provide a cam-and-follower-like interaction and slide against each other upon abutment. The non-parallel and angled surfaces hence more readily move past each other. The tip faces 228, 232, as described in connection with FIG. 7, can be employed in the embodiments of FIGS. 1-4 and 5-6, though need not be; still the embodiments of FIGS. 1-4 and 5-6 could have teeth with a flat tooth profile.

Figure 8:
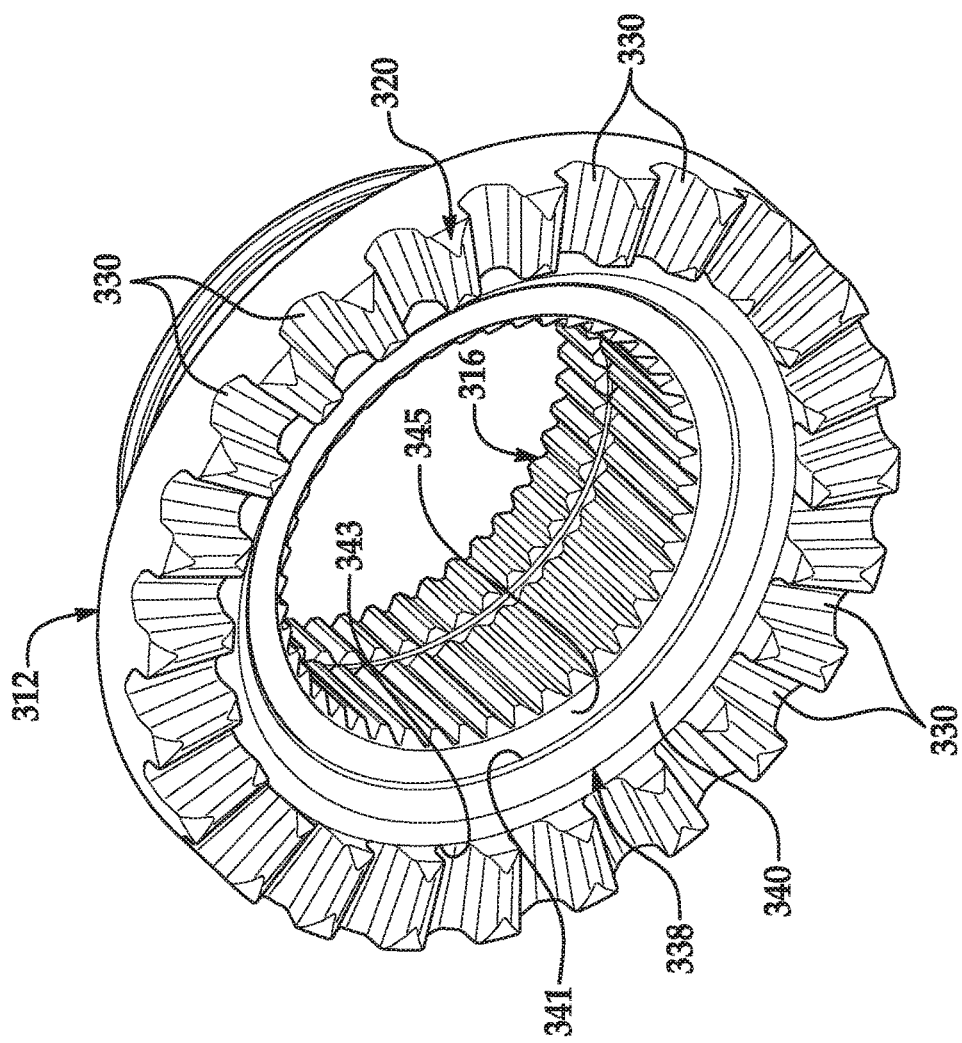
FIG. 8 is a perspective view of the first clutch part with another embodiment of a damper of the automotive driveline disconnect assembly.

FIG. 8 presents yet another embodiment of a damper 338 that can be used with the disconnect assembly of previous embodiments. The embodiment of FIG. 8 is similar in some ways to the previous embodiments, and the similarities may not be repeated in this description of FIG. 8. Indeed, similar components of previous embodiments and that of FIG. 8 have similar reference numerals, with the reference numerals of FIG. 8 having the number 300 added to the reference numeral of the similar component of previous figures.

In the embodiment of FIG. 8, the damper 338 lacks the tab-like extensions of previous embodiments and only has an annular body 340 making up its one-piece structure. From inside to outside, the body 340 has a radially-most inside end 341 and a radially-most outside end 343. Due to the absence of tab-like extensions, the roots of greater depths, as previously described, need not be provided in this embodiment, and instead all roots 330 of a first set of teeth 320 can be formed as they typically would without modification for receipt of tab-like extensions. As before, the damper 338 can be secured to, and carried by, a first clutch part 312 or a second clutch part (not depicted in FIG. 8). The securement can be effected via a press-fit if the damper 338 is manufactured as a separate component, can be effected by overmolding if manufactured that way, or can be effected another way. In the separate component example, the body 340 is placed at an inside circumference defined by the first set of teeth 20. The body 340 is seated against a ledge 345 formed somewhat as a transition between the first set of teeth 320 and splines 316. The ledge 345 can be defined by a planar surface spanning radially between the splines 316 and the first set of teeth 320.

In the embodiment of FIG. 8, instead of the second set of teeth coming into contact with the damper's tab-like extensions as in previous embodiments, the second clutch part of the embodiment of FIG. 8 can have an appendage that comes into contact with the damper's body 340 before the first and second sets of teeth come into contact with each other, thus precluding the sudden metal-to-metal abutment of the teeth and the click-like noise that might otherwise occur. The appendage, although not depicted, could be a cylindrically-shaped structure extending from the second clutch part in an axial direction toward the first clutch part 312. The extension from the second clutch part can be from a radially-inward side of the first clutch part 312, where the appendage would be aligned for contact with the body 340 upon movement to the connected state. The appendage can be designed and constructed in different ways for contact with the body 340 and for ultimate performance of the function described herein. The body 340 yields to the sliding movement and urging of the second clutch part and is compressed thereby via the appendage. The first and second sets of teeth make face-to-root mating and meshing upon compression of the body 340. The body 340 serves to absorb forces that would otherwise be imparted more immediately and directly between metal-to-metal abutment of the first and second sets of teeth. The click-like noise is hence minimized or altogether eliminated.

Figure 9:
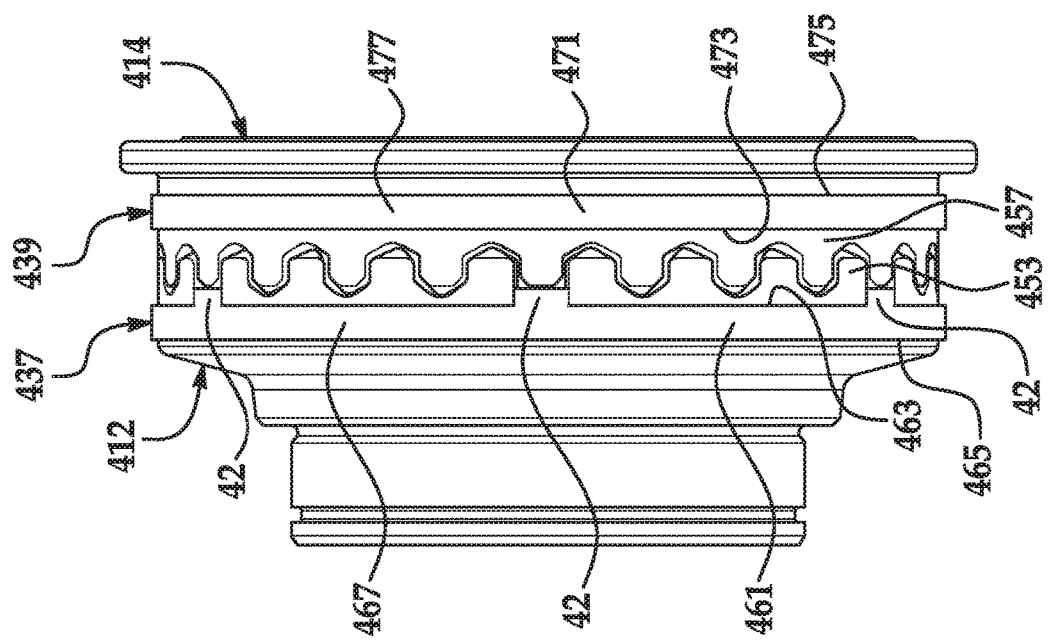
FIG. 9 is a side view of the automotive driveline disconnect assembly having another embodiment of a damper.

FIG. 9 presents other embodiments of the damper that can be used with the disconnect assembly of previous embodiments. In FIG. 9, a first damper 437 and a second damper 439 are provided. The embodiment of FIG. 9 is similar in some ways to the previous embodiments, and the similarities may not be repeated in this description of FIG. 9. Indeed, similar components of previous embodiments and that of FIG. 9 have similar reference numerals, with the reference numerals of FIG. 9 having the number 400 added to the reference numeral of the similar component of previous figures.

The first and second dampers 437, 439 are employed to resolve another occupant-audible noise from being made between components of the disconnect assembly. It has been found that a click-like or clank-like noise can occur via metal-to-metal impingement between the cam assembly 48 (FIG. 4) and a first clutch part 412 and a second clutch part 414 upon actuation to the connected and/or disconnected states. In particular, an interior surface 51 (FIG. 4) of the rotary cam 50 could impinge an exterior surface 453 (FIG. 9) of the first clutch part 412, and likewise, an interior surface 55 (FIG. 4) of the cam follower 52 could impinge an exterior surface 457 (FIG. 9) of the second clutch part 414. In installation and use, the interior surface 51 and exterior surface 453 confront and oppose each other across a radial clearance along at least part of their circumferential extents, and similarly, the interior surface 55 and exterior surface 457 confront and oppose each other across a radial clearance along at least part of their circumferential extents.

In use, the first damper 437 is situated and sandwiched radially between the rotary cam 50 and the first clutch part 412, and particularly in the radial clearance at the confrontation of the interior surface 51 and exterior surface 453. The first damper 437 can have different designs and constructions depending upon, among other possible influences, the designs and constructions of the first and second clutch parts and the cam assembly, and the degree of damping sought. In the embodiment of FIG. 9, the first damper 437 can be made of a softer material than that of the clutch parts and than that of the rotary cam; examples include a rubber material, a polymer material, or something similar; urethane is another example for an embodiment. The first damper 437 can be manufactured independently of the first clutch part and independently of the rotary cam as a separate component, can be overmolded in-place on the first clutch part or on the rotary cam, or can be manufactured via another technique. As depicted in the example of FIG. 9, the first damper 437 can span from the tab-like extensions 42 as described in the previous embodiments, and thus could be a unitary extension of the damper 38 and manufactured therewith; the first damper 437 can also be a separate component from the damper 38 and not an addition of the tab-like extensions 42. The first damper 437 can be a one-piece structure, and can have an annular body 461 with a radially-most inside end 463 and a radially-most outside end 465. The annular body 461, as depicted in FIG. 9, has a band-like design and construction that can serve as a circumferentially-continuous skin around the exterior surface 453 of the first clutch part 412. The first damper 437 is secured to, and carried by, the first clutch part 412 in the figures, but could be secured to and carried by the rotary cam 50. The securement can be effected via a press-fit if the first damper 437 is manufactured as a separate component, can be effected due to overmolding if manufactured that way, or can be effected another way.

The first damper 437 precludes the metal-to-metal impingement and click-like noise that might otherwise occur between the rotary cam 50 and the first clutch part 412. As the cam assembly 48 is being actuated, the interior surface 51 of the rotary cam 50 comes into contact with an exterior surface 467 of the first damper 437 before the interior surface 51 makes metal-to-metal abutment with the exterior surface 453 of the first clutch part 412. The body 461 can yield to the urging of the rotary cam 50 and can be compressed thereby. The body 461 serves to absorb forces that might otherwise be imparted more immediately and directly between metal-to-metal abutment of the rotary cam 50 and first clutch part 412. The click-like noise is hence minimized or altogether eliminated.

In use, the second damper 439 is situated and sandwiched radially between the cam follower 52 and the second clutch part 414, and particularly in the radial clearance at the confrontation of the interior surface 55 and exterior surface 457. The second damper 439 can have different designs and constructions depending upon, among other possible influences, the designs and constructions of the first and second clutch parts and the cam assembly, and the degree of damping sought. In the embodiment of FIG. 9, the second damper 439 can be made of a softer material than that of the clutch parts and than that of the rotary cam; examples include a rubber material, a polymer material, or something similar; urethane is another example for an embodiment. The second damper 439 can be manufactured independently of the second clutch part and independently of the cam follower as a separate component, can be overmolded in-place on the second clutch part or on the cam follower, or can be manufactured via another technique. The second damper 439 can be a one-piece structure, and can have an annular body 471 with a radially-most inside end 473 and a radially-most outside end 475. The annular body 471, as depicted in FIG. 9, has a band-like design and construction that can serve as a circumferentially-continuous skin around the exterior surface 457 of the second clutch part 414. The second damper 439 is secured to, and carried by, the second clutch part 414 in the figures, but could be secured to and carried by the cam follower 52. The securement can be effected via a press-fit if the second damper 439 is manufactured as a separate component, can be effected due to overmolding if manufactured that way, or can be effected another way.

The second damper 439 precludes the metal-to-metal impingement and click-like noise that might otherwise occur between the cam follower 52 and the second clutch part 414. As the cam assembly 48 is being actuated, the interior surface 55 of the cam follower 52 comes into contact with an exterior surface 477 of the second damper 439 before the interior surface 55 makes metal-to-metal abutment with the exterior surface 457 of the second clutch part 414. The body 471 can yield to the urging of the cam follower 52 and can be compressed thereby. The body 471 serves to absorb forces that might otherwise be imparted more immediately and directly between metal-to-metal abutment of the cam follower 52 and second clutch part 414. The click-like noise is hence minimized or altogether eliminated.

In different embodiments, the first damper 437 could be employed independently and without use of the second damper 439, independently of the dampers 38, 138, 338 of previous embodiments, and independently of the non-flat tooth profiles; still, these different dampers and/or non-flat tooth profiles could be employed in any combination with one another in different embodiments. Similarly, in different embodiments, the second damper 439 can be employed independently and without use of the first damper 437, independently of the dampers 38, 138, 338 of previous embodiments, and independently of the non-flat tooth profiles; still, these different dampers and/or non-flat tooth profiles could be employed in any combination with one another in different embodiments. Furthermore, the first and second dampers 437, 439 could be employed to resolve occupant-audible noises that occur by use of actuation approaches other than the example cam assembly 48.

It is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the disclosed assemblies and methods will be incorporated into such future embodiments. In sum, it should be understood that the invention is capable of modification and variation that is limited only by the following claims.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An automotive driveline component, comprising:
a disconnect assembly including a first clutch part and a second clutch part, said first clutch part having a first set of teeth including multiple individual teeth each having a tip face and with a root between adjacent teeth, said second clutch part having a second set of teeth including multiple individual teeth each having a tip face and with a root between adjacent teeth, said disconnect assembly including a damper situated between said first clutch part and said second clutch part, wherein a) at least a portion of the damper is placed within a root of the first clutch part, the damper is arranged to be engaged by the tip face of a tooth of the second clutch part when the disconnect assembly is in a connected state, or b) the damper is received radially inwardly of the teeth or radially outwardly of the teeth without extending radially between the teeth; and
wherein, when said disconnect assembly is brought into the connected state, said first clutch part or said second clutch part comes into contact with said damper before full engagement is made between said first and second sets of teeth.

2. The automotive driveline component as set forth in claim 1, wherein said damper is situated between said root of said first set of teeth and said tip face of said second set of teeth when said disconnect assembly is in a connected state and said first and second sets of teeth mesh together.

3. The automotive driveline component as set forth in claim 2, wherein, when said disconnect assembly is brought into the connected state, at least one tooth of said first set of teeth or said second set of teeth or both said first and second sets of teeth comes into contact with said damper before full engagement is made between said first and second sets of teeth.

4. The automotive driveline component as set forth in claim 3, wherein said damper is situated at at least one root of the individual teeth of said first set of teeth or of said second set of teeth.

5. The automotive driveline component as set forth in claim 4, wherein said at least one root in which the damper is situated has a depth greater than a depth of a root of individual teeth of said first set of teeth or said second set of teeth that 1-aelEin which said damper is not situated.

6. The automotive driveline component as set forth in claim 3, wherein said damper has a body and has multiple extensions spanning out radially from said body with each extension received within a different root.

7. The automotive driveline component as set forth in claim 6, wherein said body is disposed adjacent an inside circumference of said first set of teeth or said second set of teeth, and each of said extensions is disposed within a different one of the roots of said first set of teeth or said second set of teeth.

8. The automotive driveline component as set forth in claim 7, wherein each of said roots receiving one of said extensions has a depth greater than a depth of a root of said first set of teeth or said second set of teeth in which one of said extensions is not situated.

9. The automotive driveline component as set forth in claim 7, wherein, when said disconnect assembly is brought into the connected state, said first set of teeth or said second set of teeth or both said first and second sets of teeth come into contact with said extensions before full engagement is made between said first and second sets of teeth, and said body is not directly contacted by said first set of teeth and said second set of teeth.

10. The automotive driveline component as set forth in claim 1, wherein said damper has a body seated at a ledge formed adjacent said first set of teeth or said second set of teeth, and wherein, when said disconnect assembly is brought into the connected state, said first clutch part or said second clutch part comes into contact with said body before full engagement is made between said first and second sets of teeth.

11. The automotive driveline component as set forth in claim 1, wherein a plurality of tip faces of said first set of teeth or said second set of teeth or both said first and second sets of teeth have at least one surface with a non-parallel orientation relative to a radial plane of said first clutch part or said second clutch part.

12. The automotive driveline component as set forth in claim 11, wherein, when said disconnect assembly is brought into a connected state, said plurality of tip faces move passed confronting tip faces of said first set of teeth or said second set of teeth via the non-parallel orientation of said at least one surface upon meshing engagement between said first and second sets of teeth, and a tip face-to-tip face maintained abutment between said first and second sets of teeth is impeded via the non-parallel orientation of said at least one surface.

13. The automotive driveline component as set forth in claim 1, further comprising a second damper situated at least partly around an exterior surface of said first clutch part or said second clutch part in order to at least minimize direct abutment at said second damper between said first clutch part or said second clutch part and an actuation component used to bring said disconnect assembly to the connected state.

14. The automotive driveline component as set forth in claim 13, wherein said actuation component is of a cam assembly, and said second damper is disposed radially between said cam assembly actuation component and said first clutch part or said second clutch part.

15. The automotive driveline component as set forth in claim 1, wherein the automotive driveline component is a power transfer unit (PTU), a final drive unit (FDU), a rear drive module (RDM), an electronic differential locker (EDL), or a differential.

16. An all-wheel drive (AWD) automotive driveline comprising the automotive driveline component set forth in claim 1.

17. An automotive driveline component, comprising:
a disconnect assembly including a first clutch part, a second clutch part, and a damper, said damper situated at least partly around an exterior surface of said first clutch part or said second clutch part; and
a cam assembly located at an exterior of said disconnect assembly and interacting with said disconnect assembly in order to bring said disconnect assembly to a connected state and a disconnected state, said damper being disposed radially between said cam assembly and said first clutch part or said second clutch part;
wherein, when said disconnect assembly is brought into the connected state and to the disconnected state, direct abutment between said first clutch part or said second clutch part and said cam assembly is at least minimized at said damper.

18. The automotive driveline component as set forth in claim 17, wherein said damper includes a first damper and a second damper, said first damper being situated at least partly around an exterior surface of said first clutch part, said second damper being situated at least partly around an exterior surface of said second clutch part.

19. The automotive driveline component as set forth in claim 18, wherein said cam assembly includes a rotary cam and a cam follower, said rotary cam located at an exterior of said first clutch part, said cam follower located at an exterior of said second clutch part, and wherein, when said disconnect assembly is brought into the connected state and to the disconnected state, direct abutment between said first clutch part and said rotary cam is at least minimized at said first damper, and direct abutment between said second clutch part and said cam follower is at least minimized at said second damper.

20. An automotive driveline component, comprising:
a disconnect assembly including a first clutch part, a second clutch part, a first damper, and a second damper, said first clutch part having a first set of teeth, said second clutch part having a second set of teeth, said first damper being situated between said first clutch part and said second clutch part, said second damper being situated at least partly around an exterior surface of said first clutch part or said second clutch part; and
a cam assembly located at an exterior of said disconnect assembly and interacting with said disconnect assembly in order to bring said disconnect assembly to a connected state and a disconnected state, said second damper being disposed radially between said cam assembly and said first clutch part or said second clutch part;
wherein, when said disconnect assembly is brought into the connected state and into the disconnected state, said first clutch part or said second clutch part comes into contact with said first damper before complete meshing is made between said first and second sets of teeth, and direct abutment between said first clutch part or said second clutch part and said cam assembly is at least minimized at said second damper.

* * * * *